UNITED STATES PATENT OFFICE.

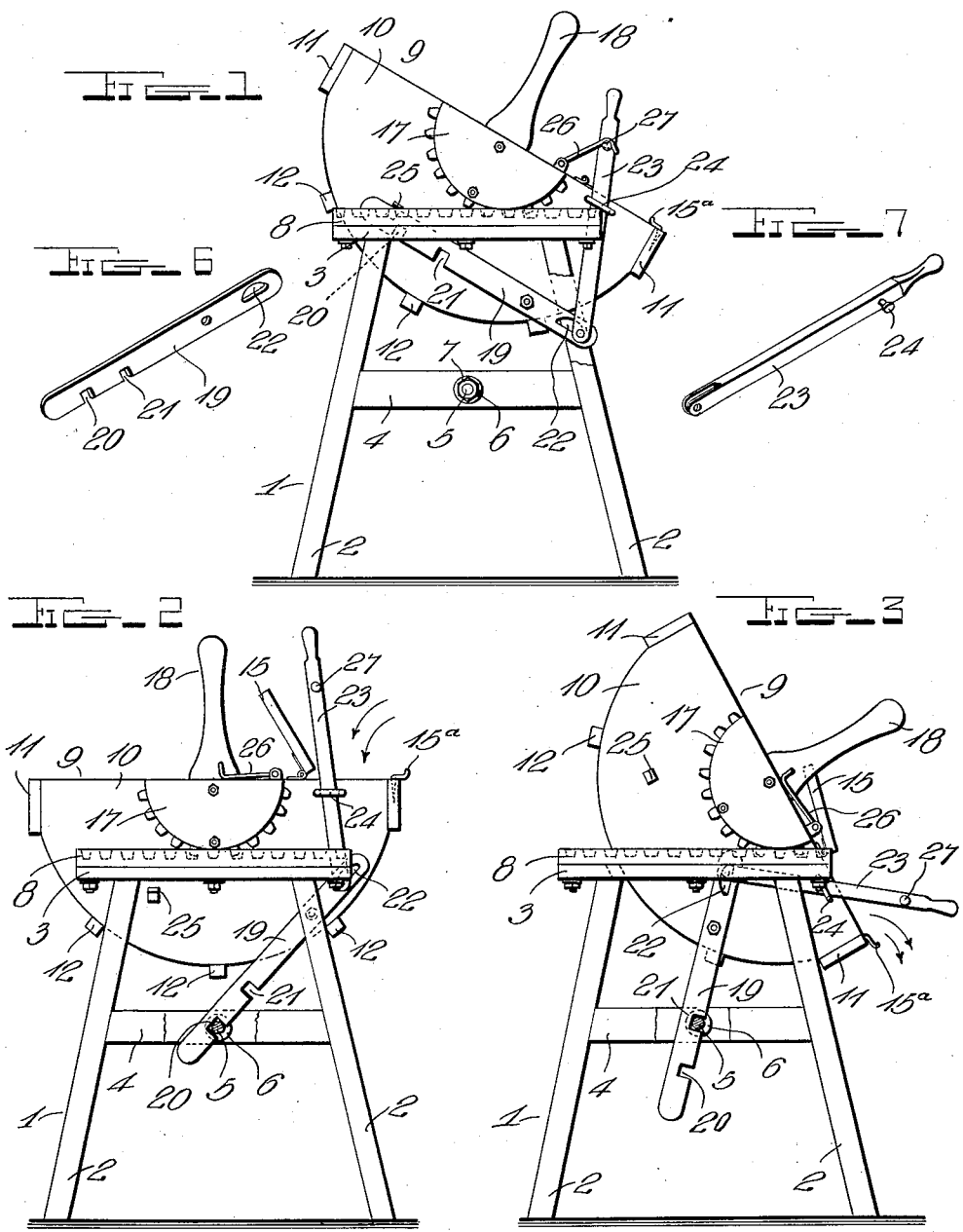

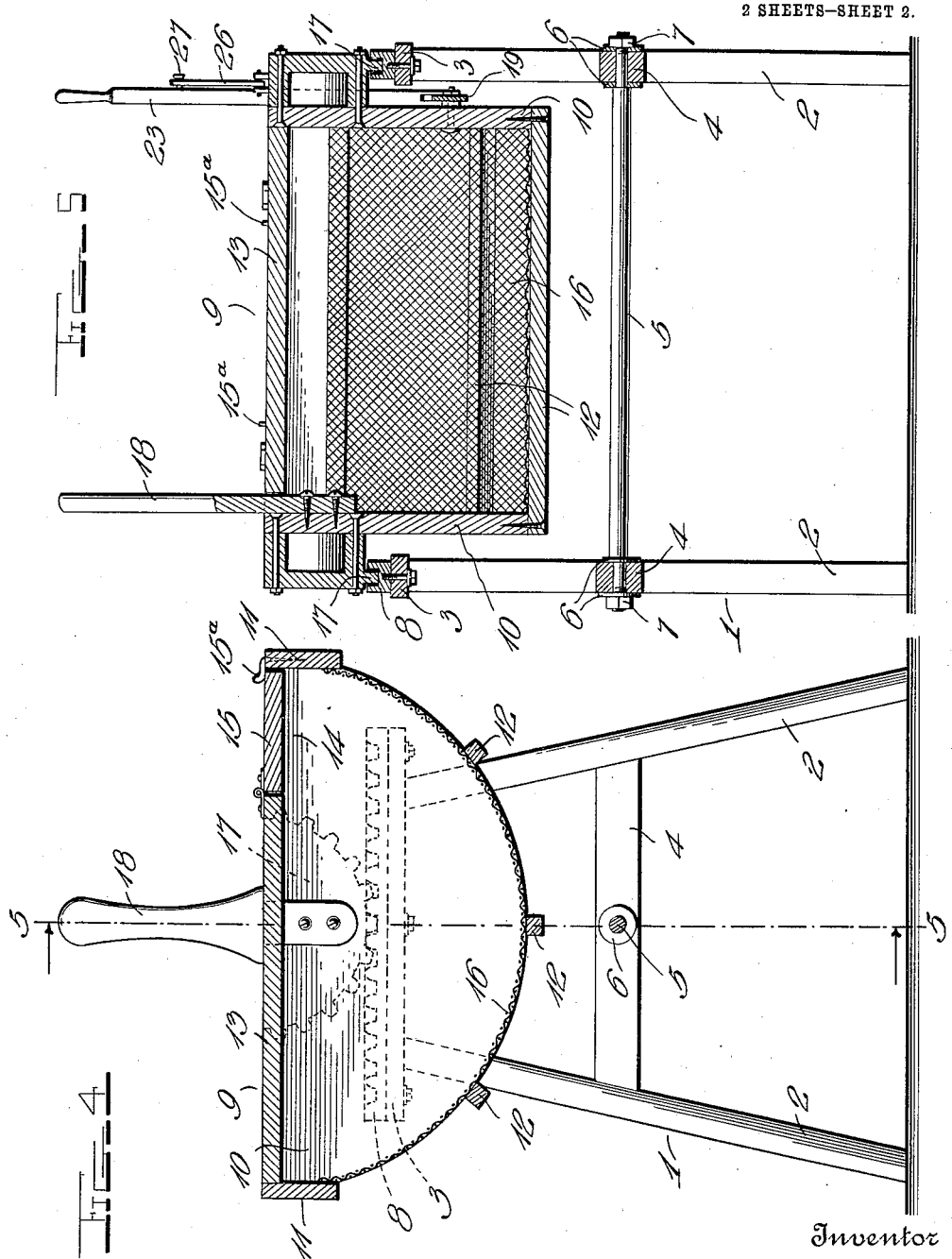

THOMAS KENNEDY BARNETT, OF SHELBY, NORTH CAROLINA.

SEED AND GRAIN SEPARATOR.

1,023,983.  Specification of Letters Patent.  Patented Apr. 23, 1912.

Application filed November 20, 1911. Serial No. 661,373.

*To all whom it may concern:*

Be it known that I, THOMAS KENNEDY BARNETT, a citizen of the United States, residing at Shelby, in the county of Cleveland and State of North Carolina, have invented certain new and useful Improvements in Seed and Grain Separators; and I do declare the following to be a full, clear, and exact description of the invention, such as will enable others skilled in the art to which it appertains to make and use the same.

This invention relates to improvements in seed and grain separators.

One object of the invention is to provide a grain and seed separator and cleaning device having an improved construction and arrangement of supporting and operating mechanism and means for locking the separator in position for filling and for emptying.

Another object is to provide a machine of this character which will be simple, strong and durable in construction, efficient, reliable and economical in operation and well adapted to the purpose for which it is designed.

With these and other objects in view the invention consists of certain novel features of construction, and the combination and arrangement of parts as will be more fully described and claimed.

In the accompanying drawings; Figure 1 is a side view of the machine with parts broken away and in section showing the machine in operative position; Fig. 2 is a similar view showing the position of the locking mechanism for holding the separator while being filled; Fig. 3 is a similar view showing the body of the separator and the locking mechanism for holding the same in a position for discharging the contents thereof; Fig. 4 is a central vertical longitudinal section on an enlarged scale with the parts in the position shown in Fig. 2; Fig. 5 is a vertical section on the line 5—5 of Fig. 4. Fig. 6 is a detail perspective view of the locking bar for holding the separator in position for emptying or filling; Fig. 7 is a similar view of the lever for operating the locking bar.

In the embodiment of the invention, I provide a supporting frame comprising standards 1 each of which consists of a pair of inclined supporting legs 2 connected at their upper ends by an upper cross bar 3 and between their ends by an intermediate cross bar 4. The standards are connected together by a transversely disposed tie rod or bar 5. The rod 5 is provided with reduced threaded ends on which are arranged clamping plates or washers 6 and clamping nuts 7. The washers and nuts 6 and 7 are arranged on opposite sides of the cross bar 4 and said nuts are adapted to be screwed up to clamp the washers into tight engagement with the opposite sides of the cross bar thereby rigidly securing the standards 1 together. On the upper cross bars 3 are arranged rack bars 8 the purpose of which will be hereinafter described. Between the upper ends of the standards is arranged the body 9 of the separator, said body being of substantially semi-cylindrical form and comprising side boards or plates 10 which are connected near their upper ends by cross bars 11. The side plates 10 are connected around their curved lower edges by a series of narrow cross bars 12.

Secured to the upper edges of the sides of the body is a top 13 one end of which terminates short of the adjacent end of the body and forms a filling and discharge opening 14 which is adapted to be closed by a door 15, said door being preferably hinged at its inner edge to the end of the top and is provided with suitable turn buttons or catches 15ª whereby the door is normally held in closed position. The bottom 16 of the body comprises a screen formed of wire netting or other suitable foraminous material through which the inferior seed and foreign matter is removed from the good seed or grain by the operation of the separator.

The body 9 is operatively supported between the upper ends of the standards 1 by segmental gears 17 secured to and spaced a suitable distance from the sides of the body and adapted to be engaged with the rack bars 8 on the upper cross bars of the standards. When thus supported the body is adapted to be rocked back and forth on the rack bars whereby an oscillating motion is imparted to the body to throw the contents thereof back and forth over the screen bottom 16 thus thoroughly agitating the contents thereof and causing the inferior seed and grain and foreign matter to pass through the bottom. In order to facilitate the rocking movement of the body 9 the latter is provided with an upwardly extending handle 18 the lower end of which is reduced and extends through the top and is secured to one side of the body as shown. The handle 18 is preferably disposed at the center of the side to which the same is attached.

In order to hold the body against movement while being filled or emptied, I provide a suitable locking mechanism comprising a locking bar 19 which is pivotally connected near one end to one side of the body and has formed in its lower edge adjacent to its free end, locking notches 20 and 21. In the pivoted end of the bar is formed a curved slot 22 and to said end is connected the bifurcated lower end of an operating lever 23 which projects upwardly and is slidably engaged with a guide loop 24 arranged in the adjacent side of the body as shown. When the seed or grain is to be placed in the body of the separator, said body is locked or fastened in a horizontal position by the locking bar 19 which is swung downwardly by the lever 23 until the notch 20 in said bar engages the tie rod 5, said engagement of the bar with the rod firmly holding the body in a horizontal position for filling, this position of the body and locking mechanism being clearly shown in Fig. 2 of the drawing. When it is desired to discharge the contents from the body of the separator, the body is tilted in the position shown in Fig. 3 of the drawing in which position the same is held by the engagement of the notch 21 in the locking bar with the tie rod as clearly shown in Fig. 3 of the drawing. When the body is in a position for operation the locking bar is retracted to a horizontal position as shown in Fig. 1 of the drawings in which position, said bar is engaged with the stop pin 25 and when in this position the lever 23 is fastened by means of a latch or hook 26 pivotally secured to one side of the body and having its free end engaged with a pin or stud 27 arranged in and projecting from the inner side of the lever as shown. When the locking mechanism is thus arranged and fastened the same will be prevented from interfering with the oscillation or rocking movement of the body and when it is desired to fasten the body in a horizontal or tilted position the locking bar may be readily actuated by the lever to engage the notches in said bar with the tie rod of the supporting frame as hereinbefore described.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In a seed and grain separator, a supporting frame, a working body mounted to oscillate on said frame, locking mechanism for holding said body in position for filling or emptying said mechanism, comprising a locking bar pivotally secured intermediately of its ends to one side of the body and having a plurality of longitudinally spaced locking notches in one edge for engagement with a portion of said supporting frame, whereby the body may be held in a horizontal or in a tilted position, said bar having a curved slot therein, an operating lever slidably secured to one side of the body and having a pin loosely engaged with said curved slot whereby the bar is actuated to engage the notches therein with the supporting frame and to swing said bar to an inoperative position, and means for limiting the upward movement of said bar when swung to inoperative position and for holding it against wabbling.

2. In a seed and grain separator, a supporting frame, a working body mounted to oscillate on said frame, locking mechanism for holding said body in position for filling or emptying said mechanism, comprising a locking bar pivotally secured near one end to one side of the body and having a plurality of longitudinally spaced locking notches in one edge for engagement with a portion of said supporting frame, whereby the body may be held in a horizontal or in a tilted position, an operating lever slidably secured to one side of the body and having a bifurcated end straddling and loosely connected with the pivoted end of the bar, whereby the latter is actuated to engage the notches therein with the supporting frame and to swing said bar to inoperative position, means for locking said lever to hold the locking bar in inoperative position and a stop on said body for limiting the upward movement of said bar and holding it against wabbling when in inoperative position.

In testimony whereof I have hereunto set my hand in presence of two subscribing witnesses.

THOMAS KENNEDY BARNETT.

Witnesses:
   CLYDE R. HORY,
   F. BARNETT.